US012281493B2

(12) United States Patent
Lehner, Jr. et al.

(10) Patent No.: US 12,281,493 B2
(45) Date of Patent: Apr. 22, 2025

(54) EXIT TRIM WITH SIMPLIFIED LEVER HANDING

(71) Applicant: Schlage Lock Company LLC, Carmel, IN (US)

(72) Inventors: Jack R. Lehner, Jr., Indianapolis, IN (US); Joseph Janik, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 18/239,505

(22) Filed: Aug. 29, 2023

(65) Prior Publication Data

US 2024/0200359 A1 Jun. 20, 2024

Related U.S. Application Data

(60) Continuation of application No. 16/940,896, filed on Jul. 28, 2020, now Pat. No. 11,739,559, which is a division of application No. 14/593,570, filed on Jan. 9, 2015, now Pat. No. 10,724,270.

(51) Int. Cl.
*E05B 3/06* (2006.01)
*E05B 63/04* (2006.01)

(52) U.S. Cl.
CPC .............. *E05B 3/06* (2013.01); *E05B 63/042* (2013.01)

(58) Field of Classification Search
CPC ................................. E05B 3/06; E05B 63/042
See application file for complete search history.

(56) References Cited

U.S. PATENT DOCUMENTS

| | | | | |
|---|---|---|---|---|
| 3,718,015 | A | 2/1973 | Tornoe et al. | |
| 4,884,835 | A | 12/1989 | Smallegan et al. | |
| 5,085,474 | A | 2/1992 | Toledo et al. | |
| 5,092,144 | A | 3/1992 | Fleming et al. | |
| 5,141,269 | A | 8/1992 | Haq et al. | |
| 5,177,987 | A | 1/1993 | Shen | |
| 5,516,161 | A | 5/1996 | Mader et al. | |
| 5,787,743 | A | 8/1998 | Weigard | |
| 5,794,472 | A * | 8/1998 | Kester | E05B 55/005 70/472 |
| 6,601,270 | B2 | 8/2003 | Eckhardt et al. | |
| 6,735,993 | B2 | 5/2004 | Eller et al. | |
| 7,152,891 | B2 | 12/2006 | Bergen et al. | |
| 7,178,373 | B2 | 2/2007 | Shen et al. | |
| 7,188,873 | B2 | 3/2007 | Brown et al. | |
| 7,257,973 | B2 * | 8/2007 | Romero | E05B 9/02 292/336.3 |
| 8,011,702 | B2 | 9/2011 | Tien et al. | |
| 9,464,458 | B2 | 10/2016 | Huang et al. | |

(Continued)

OTHER PUBLICATIONS

Canadian Office Action; Canadian Intellectual Property Office; Canadian Application No. 2,973,486; Jun. 1, 2018; 4 pages.

(Continued)

*Primary Examiner* — Michael P Ferguson
*Assistant Examiner* — Thomas L Neubauer
(74) *Attorney, Agent, or Firm* — Taft Stettinius & Hollister LLP

(57) ABSTRACT

There is disclosed an exit trim that permits simplified changing of the handing of a lever handle between a left hand and a right hand orientation. The handing orientation of the lever handle can be repositioned without disassembling the exit trim or removing components positioned within the exit trim.

20 Claims, 12 Drawing Sheets

(56) References Cited

U.S. PATENT DOCUMENTS

| | | | | |
|---|---|---|---|---|
| 2003/0189342 | A1 | 10/2003 | Chong et al. | |
| 2005/0034271 | A1 | 2/2005 | Denys | |
| 2005/0046203 | A1 * | 3/2005 | Huang | E05B 13/004 292/348 |
| 2005/0156441 | A1 | 7/2005 | Tsai | |
| 2006/0071484 | A1 | 4/2006 | Chen | |
| 2011/0047756 | A1 | 3/2011 | Fan et al. | |
| 2013/0168978 | A1 | 7/2013 | Huang et al. | |
| 2014/0007631 | A1 | 1/2014 | Wood et al. | |
| 2014/0191516 | A1 | 7/2014 | Badhya et al. | |
| 2015/0107314 | A1 | 4/2015 | Le | |

OTHER PUBLICATIONS

Canadian Office Action (second); Canadian Intellectual Property Office; Canadian Application No. 2,973,486; Feb. 8, 2019; 3 pages.

International Search Report; International Searching Authority; US Patent and Trademark Office; International Application No. PCT/US2016/012682; May 23, 2016; 4 pages.

Written Opinion; International Searching Authority; US Patent and Trademark Office; International Application No. PCT/US2016/012682; May 23, 2016; 8 pages.

Von Duprin 994/996L-DT/L Rigid Trim, Installation Instructions, 1 page, Copyright Allegion 2014.

Von Duprin 994/996L/L-BE Breakaway Trim for Panic and Fire 98/99 Series Rim and Vertical Rod Exit Devices; Installation Instructions, 2 pages, Copyright Allegion 2014.

Saudi Arabian Examination Report; Saudi Arabian Patent Office; Saudi Arabian Patent Application No. 517381903; Nov. 22, 2020; 8 pages.

Canadian Examination Report; Canadian Intellectual Property Office; Canadian Patent Application No. 3,078,041; Oct. 4, 2021; 3 pages.

UAE Search Report; UAE Patent Office; UAE Patent Application No. P6000855/2017; Jul. 18, 2021; 5 pages.

UAE Examination Report; UAE Patent Office; UAE Patent Application No. P6000855/2017; Jul. 18, 2021; 6 pages.

* cited by examiner

EXIT TRIM WITH SIMPLIFIED LEVER HANDING

CROSS REFERENCE TO RELATED APPLICATIONS

The present application is a continuation of U.S. patent application Ser. No. 16/940,896 filed Jul. 28, 2020 and issued as U.S. Pat. No. 11,739,559, which is a divisional of U.S. patent application Ser. No. 14/593,570 filed Jan. 9, 2015 and issued as U.S. Pat. No. 10,724,270, the contents of each application are incorporated herein by reference in their entirety.

TECHNICAL FIELD

The present disclosure generally relates to an exit trim arranged to simplify reversing the handing of a lever handle for opening a door, and more specifically to an exit trim configured to permit selectively aligning the lever handle for operation with either a left handed or right handed opening door. The present disclosure further generally relates to a designated component that fails in response to an over-turn force applied to the lever handle to prevent damage to interior components of the exit trim.

BACKGROUND

Lever handles for doors can be repositioned approximately 180 degrees apart depending on whether the lever handle will be used on a door that opens from the left hand side or a door that opens from the right hand side. Typically lever handles are changed between right hand and left hand orientations by removing and reorienting portions of the handle assembly and/or disassembling the exit trim to gain access to and re-orienting adjustable internal components to allow operation of the internal mechanisms when the handing is reversed. These can be both time consuming and cumbersome for the exit trim installer, particularly in a field installation situation.

In addition, attempts at unauthorized entry can result in damage to the internal components of the exit trim when an excessive over-tum force is applied to a lever handle. As a result, the damaged internal components must be identified and then replaced to allow the door to function properly. Accordingly there remains a need for further contributions in this area of technology.

SUMMARY

Certain embodiments of the present disclosure include an exit trim assembly configured for simplified changing of the handing of a lever handle associated with the exit trim assembly to selectively operate with either right hand or left hand opening doors. Other embodiments include an exit trim assembly with at least one designated component that secures the lever handle to the exit trim assembly in the desired left or right hand orientation and also that fails in response to an over-turn force applied to the lever handle to prevent damage to other components of the exit trim assembly. Still other embodiments include apparatuses, systems, devices, hardware, methods, and combinations for the same. Further embodiments, forms, features, aspects, benefits, and advantages of the present application shall become apparent from the description and figures provided herewith.

BRIEF DESCRIPTION OF THE FIGURES

The description herein makes reference to the accompanying drawings where like reference numerals refer to like parts throughout the several views.

FIG. 7A is a sectional view taken along the line 7A-7A of FIG. 17A, and FIG. 7B is a sectional view taken along the line 7B-7B of FIG. 17B.

DETAILED DESCRIPTION OF THE ILLUSTRATIVE EMBODIMENTS

Figure 1B:
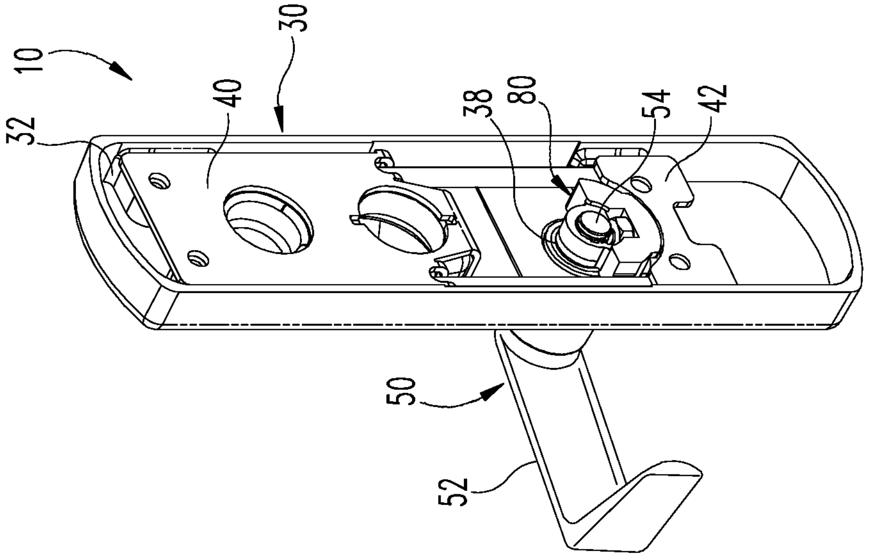
FIGS. 1A and 1B are perspective views of a portion of an exit trim assembly according to one embodiment of the present disclosure.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1A:
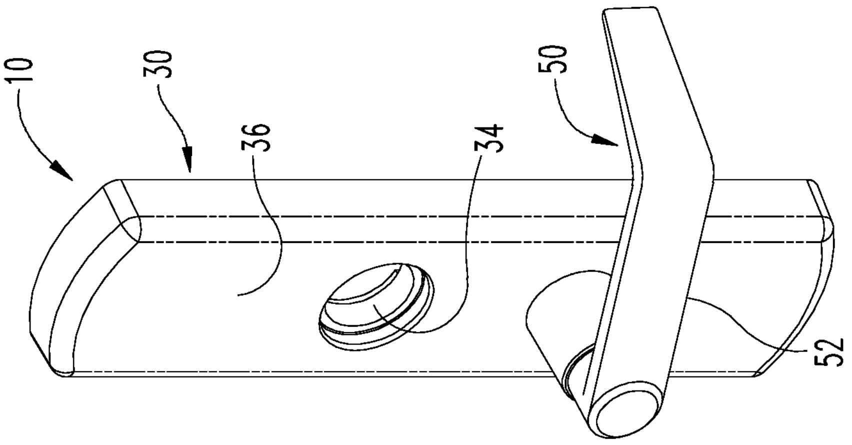

Referring now to FIGS. 1A and 1B, an exit trim assembly 10 according to the present disclosure is illustrated therein. The exit trim assembly 10 can be configured for a door 20 or similar moveable structures that are selectively locked to fixed structures with one or more of a latching mechanism and a locking mechanism (not shown.) In one embodiment, door 20 is of a type with a panic bar (not shown) on the side of the door that is opposite exit trim assembly 10. Exit trim assembly 10 includes an escutcheon housing 30 defining an interior 32, a first opening 34 through a wall 36 of housing 30 to receiving a locking mechanism, and a second opening 38 through wall 36 to receive a portion of lever handle 50. First opening 34 is optional and can be used for mounting of a lock or key.

The interior 32 of escutcheon housing 30 houses a guide post assembly 40, an endplate 42, and a slider mechanism 70 (FIG. 6) that are operable with an input cam assembly 80 through lever handle 50 to operate the latch mechanism to open and close door 20. As further shown in FIGS. 2A and 2B, lever handle 50 includes a handle portion 52 that is grasped by the user to rotate the spindle portion 54, which extends from and is fixed to handle portion 52 to operate the latch mechanism.

Figure 2B:
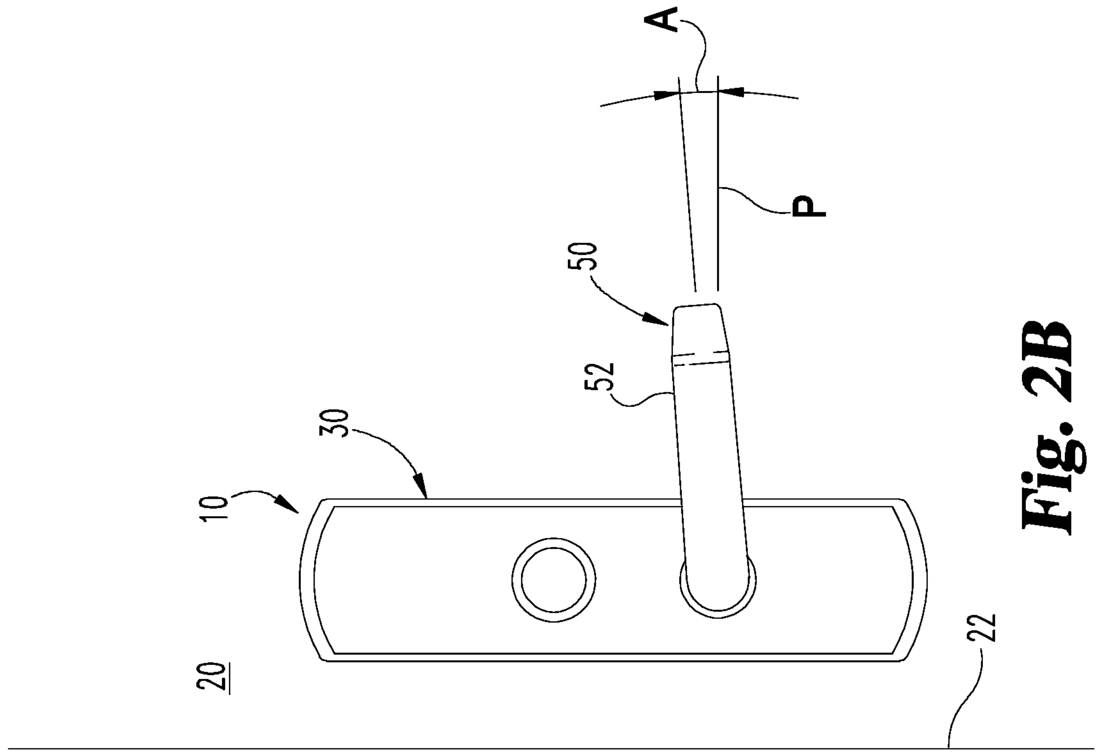
FIGS. 2A and 2B are elevation views of the exit trim assembly of FIGS. 1A and 1B with the lever handle in a left hand orientation and a right hand orientation, respectively.
Figure 2A:
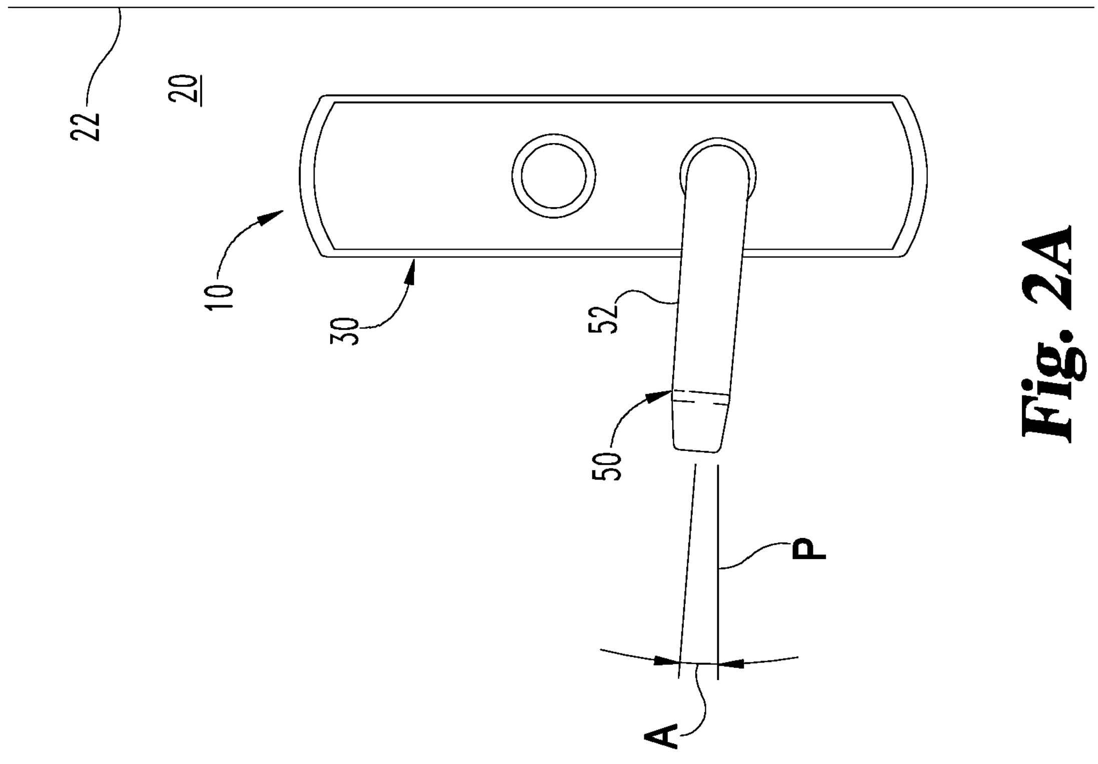

In the illustrated embodiment, handle portion 52 extends in a non-perpendicular orientation to an adjacent edge 22 of door 20 with lever handle 50 in either the left hand orientation of FIG. 2A or the right hand orientation of FIG. 2B. In a particular embodiment, input cam assembly 80 orients handle portion 52 at a slight upward angle A from a perpendicular axis P that defines a perpendicular orientation with edge 22 in either of the left hand or right hand orientations. The slight upward deviation from a perpendicular orientation eliminates droop in handle portion 52 and improves aesthetics. In another embodiment, handle portion 52 extends perpendicular to edge 22 along perpendicular axis P.

Figure 3:
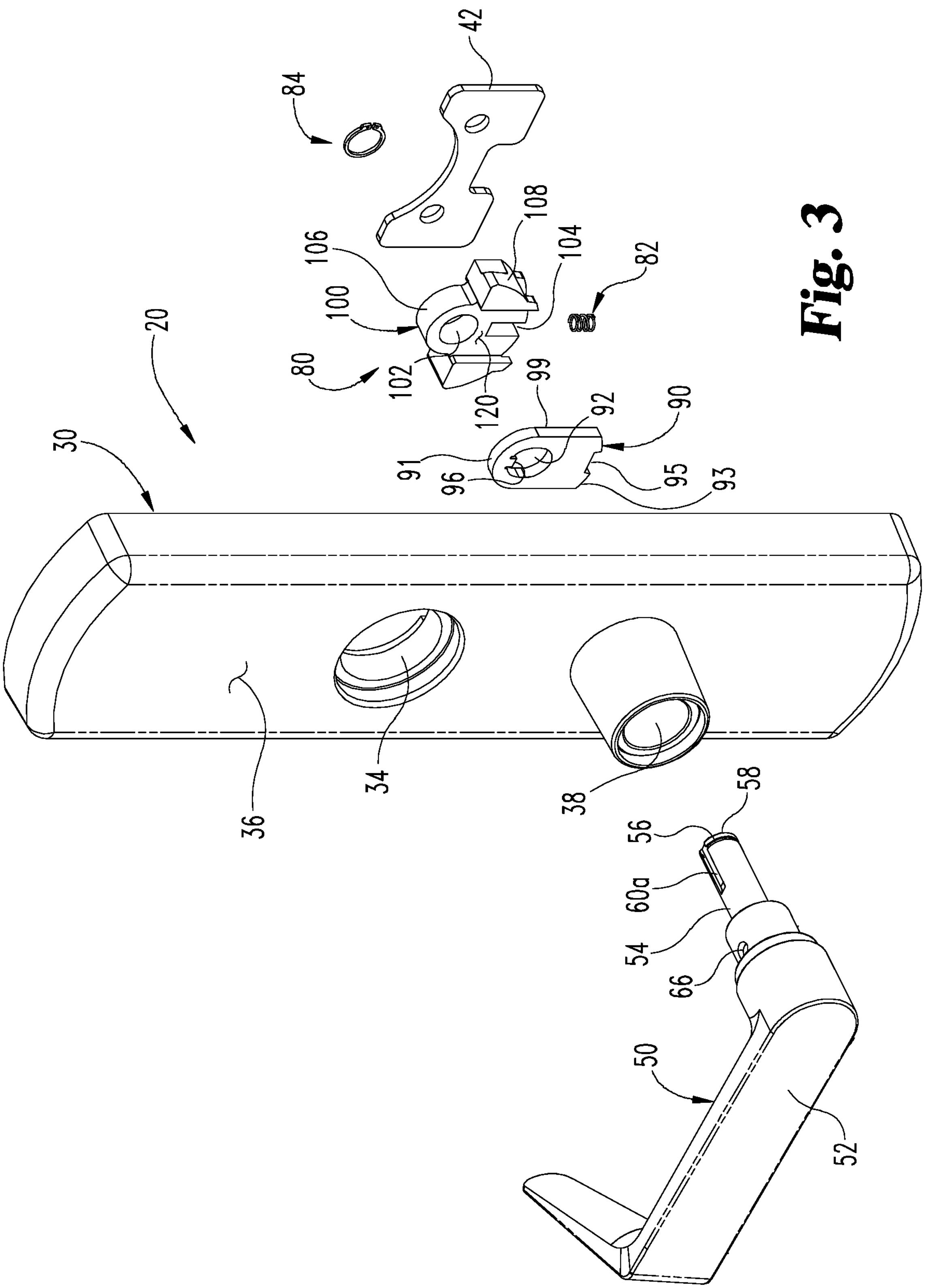
FIG. 3 is an exploded perspective view of the exit trim assembly of FIGS. 1A-1B looking toward an exterior of the escutcheon housing.
Figure 4:
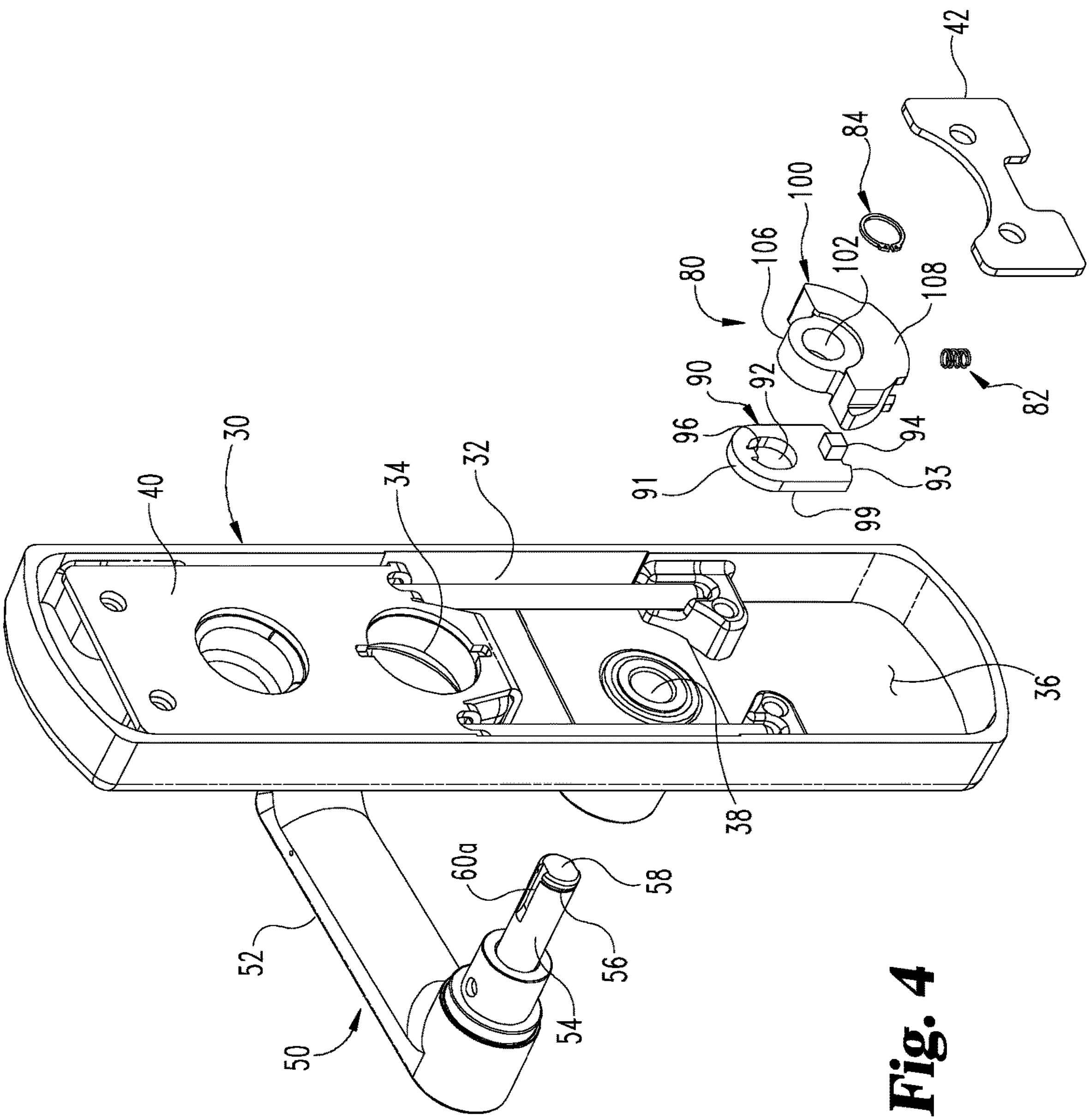
FIG. 4 is another exploded perspective view of the exit trim assembly of FIGS. 1A-1B looking toward an interior of the escutcheon housing.

Referring further to FIGS. 3-4, further details of exit trim assembly 10 are shown in an exploded view. Spindle portion 54 is positionable through second opening 38 and engageable to input cam assembly 80 in interior 32 of housing 30 to couple lever handle 50 to the latch mechanism of the door 20. In the illustrated embodiment, input cam assembly 80 includes an input cam 100, a locking member 90, and a biasing member 82. In the illustrated embodiment, biasing member 82 is a coil spring, but any suitable biasing member is contemplated.

Input cam 100 defines a first aperture 102 and locking member 90 defines a second aperture 92 that each receive spindle portion 54 of lever handle 50. In addition, input cam 100 defines a compartment 104 that receives biasing member 82. First aperture 102 is defined by a first body portion 106 of input cam 100, and compartment 104 is defined by a second body portion 108 of input cam 100. First body portion 106 is generally cylindrical and second body portion 108 is generally semi-cylindrical and projects laterally outwardly from first body portion 106. Input cam 100 further includes a recessed surface 120 in second body portion 106 that faces handle portion 54.

Locking member 90 is positioned in recessed surface 120 to form a low-profile input cam assembly 80. A support flange 94 extends from locking member 90 into compartment 104 of input cam 100, and biasing member 82 extends between support flange 94 and input cam 100 in compartment 104. The body 99 of locking member 90 extends between a first end 91 and an opposite second end 93. A locking projection 96 that removably engages spindle portion 54 in a desired one of the left hand and right hand orientations extends into aperture 92 adjacent first end 91. Aperture 92 is elongated to allow reciprocal movement of locking member 90 a sufficient distance related to spindle portion 54 to allow displacement of locking projection 96 from the respective locking recess 60*a*, 60*b* of spindle portion 54. A notch 95 is defined by second end 93 of locking member 90 to receive an engagement tool to allow reversing of lever handle 50, as discussed further below. A retaining ring 84 is removably engageable to a circumferential groove 56 adjacent an inner end 58 of spindle portion 54. Retaining ring 84 retains input cam assembly 80 on spindle portion 54.

Figure 5B:
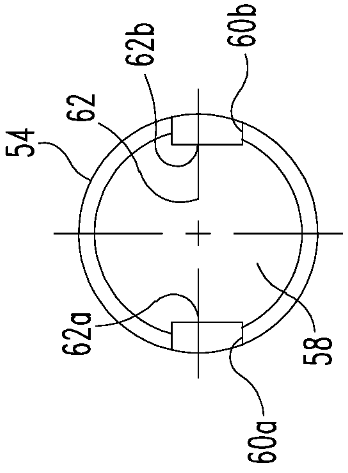
FIGS. 5A and 5B are a perspective view and end elevation view, respectively, of a spindle portion of the lever handle.
Figure 5A:
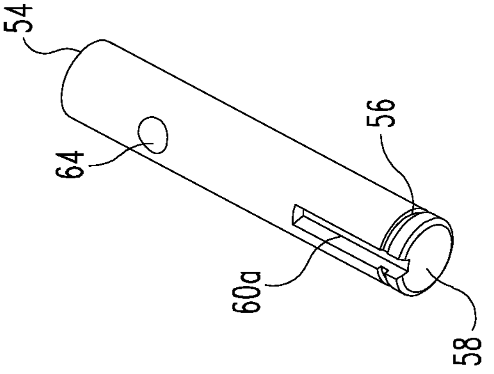

As further shown in FIGS. 5A and 5B, spindle portion 54 includes a first longitudinally extending locking recess 60*a* and a second longitudinally extending locking recess 60*b* that extend through inner end 58. First and second locking recesses 60*a*, 60*b* are positioned generally opposite one another on the outer perimeter or outer surface of spindle portion 54. One of the locking recesses 60*a*, 60*b* receives locking projection 92 to couple lever handle 50 to input cam assembly 80 in a desired orientation. Locking recesses 60*a*, 60*b* are not diametrically opposite one another, but are each slightly offset to a first side of a perpendicular axis 62. Perpendicular axis 62 defines diametrically opposite locations 62*a*, 62*b* in which handle portion 52 of lever handle 50 would be perpendicular to the edge 22 of door 20 if recesses 60*a*, 60*b* were centered on these locations 62*a*, 62*b*. However, in the illustrated embodiment, recesses 60*a*, 60*b* are not centered on locations 62*a*, 62*b*, but are slightly offset from these locations 62*a*, 62*b* to the same side of perpendicular axis 62. The offset locations of locking recesses 60*a*, 60*b* from the adjacent locations 62*a*, 62*b* permit handle portion 52 to be angled at angle A from a perpendicular orientation relative to edge 22 of door 20, as discussed above. In another embodiment, recesses 60*a*, 60*b* are centered on perpendicular locations 62*a*, 62*b*.

Figure 6:
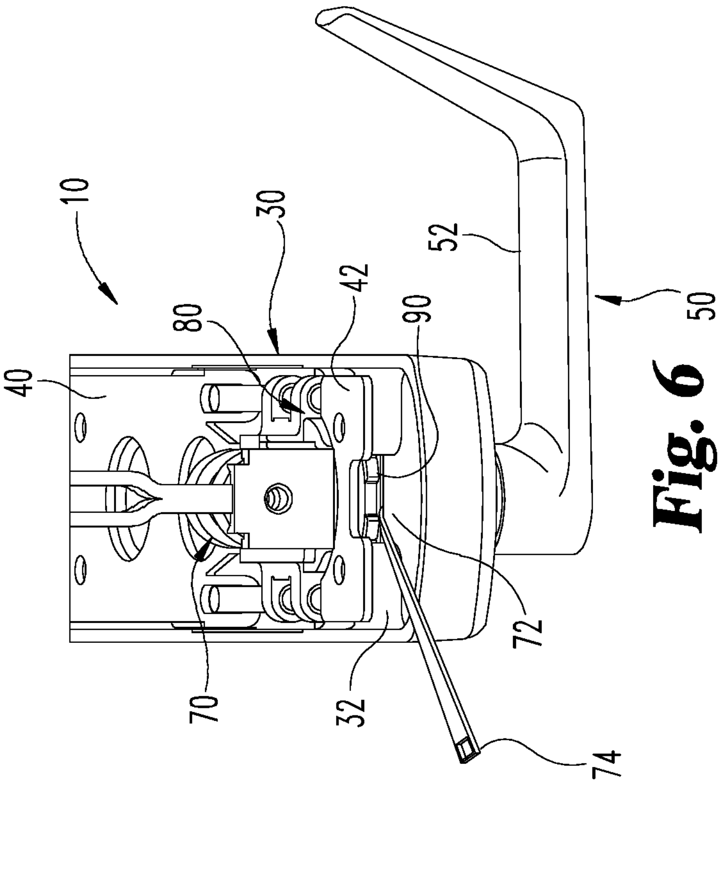
FIG. 6 is a perspective view of the exit trim assembly showing a tool access to the locking mechanism in the input cam assembly to permit reversal of the handing of the lever handle.

Spindle portion 54 may further include a bore 64 to receive a fastener 66 to secure spindle portion 54 to handle portion 52. In other embodiments, spindle portion 54 is fixed relative to handle portion 52, or formed as a one-piece construct with handle portion 52. In any configuration of lever handle 50, input cam assembly 80 is located in the interior 32 of the escutcheon housing 30 and, as shown in FIG. 6, is arranged so the locking member 90 is accessible with a tool 74 through a gap 72 formed between housing wall 36 and end plate 42. The engagement tool 74 can be manipulated into notch 95 to depress locking member 90 against the biasing member 82, removing locking projection 96 from the engaged recess 60*a*, 60*b* and allow a change of handing for lever handle 90.

Figure 7A:
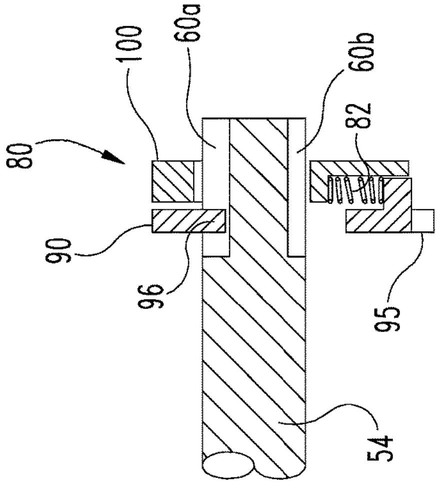
FIGS. 7A and 7B are sectional views of an input cam assembly of the exit trim assembly engaged and disengaged, respectively, to a spindle portion of the lever handle.
Figure 7B:
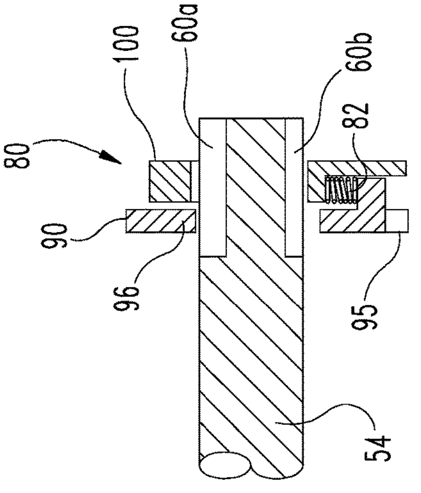

Referring to FIGS. 7A and 7B, there is shown locking member 90 in a locked positon and an unlocked position, respectively. In the locked position, locking projection 96 is biased toward and received in longitudinal locking recess 60*a* by biasing member 82. The tool 74 can be used to push locking member 90 and compress biasing member 82 between input cam 100 and support flange 94 to displace locking projection 96 from locking recess 60*a*. In this unlocked position, lever handle 50 can be rotated, such as from the position in FIG. 2A to the position in FIG. 2B, to align second longitudinal locking recess **60*b* with locking projection 96. Locking member 90 can then be released so that biasing member 82 displaces locking member 90 to position locking projection 96 in the second longitudinal locking recess 60*b***.

Figure 8:
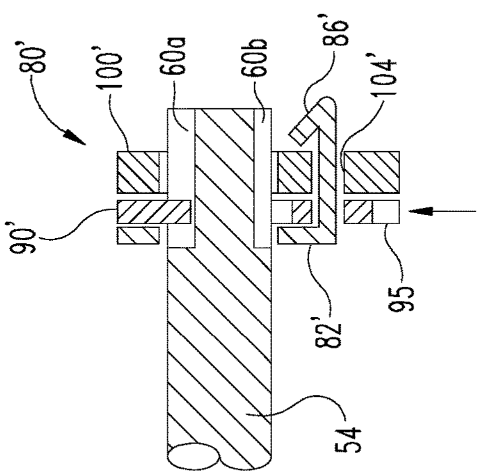
FIG. 8 is a sectional view of another embodiment input cam assembly.
Figure 9A:
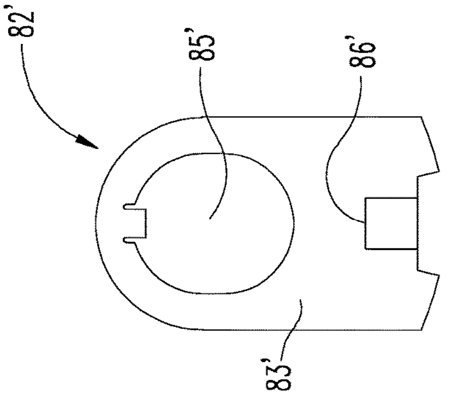
FIGS. 9A and 9B are front and side elevational views, respectively, of a biasing member of the input cam assembly of FIG. 8.
Figure 9B:
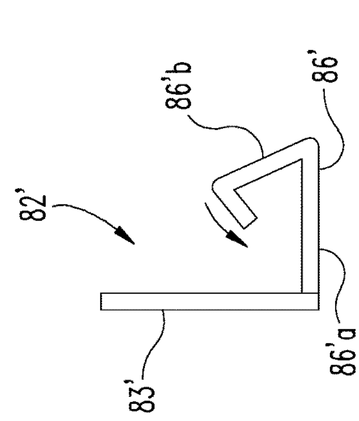
Figure 10:
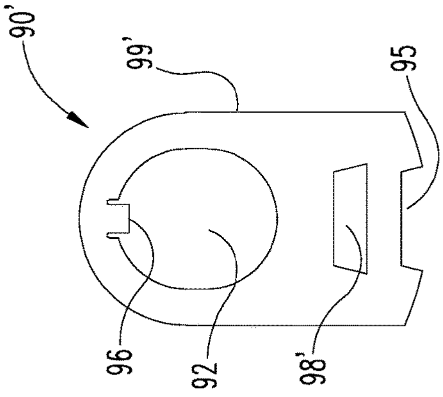
FIG. 10 is a front elevational view of a locking member of the input cam assembly of FIG. 8.

FIGS. 8-10 show another embodiment input cam assembly 80' that is similar to input cam assembly 80, but includes a modified biasing member 82'. Biasing member 82' includes a plate-like body 83' that defines a third aperture 85' that receives spindle portion 54. Biasing member 82' further includes a spring tab 86' extending laterally outwardly from an end of body 83' of biasing member 82'. Locking member 90' is also modified from locking member 90 to include a passage 98' through body 99', with other components the same as locking member 90. Spring tab 86' extends through passage 98'. Input cam 100' includes a modified compartment 104' to receive spring tab 86' to couple locking member 90' between biasing member 82' and input cam 100' on spindle portion 54. In the illustrated embodiment, spring tab 86' extends through compartment 104', but could also terminate within compartment 104' in other embodiments.

As shown in FIG. 9B, spring tab 86' includes a laterally extending portion **86*a*' and a hook portion 86*b*' at an end of laterally extending portion 86*a*'. Hook portion 86*b*' compresses to allow insertion through passage 98' and compartment 104', and then decompresses when released to couple locking member 90' to input cam 100'. A tool, such as tool 74, can be used to depress locking member 90' in notch 95 and displace locking projection 96 from the aligned locking recess 60*a*, 60*b* by bending spring tab 86', which is configured to deflect to accommodate such displacement. The orientation of lever handle 50 can then be rotated to changing its handing as discussed above. Release of locking member 90' allows spring tab 86' to un-deflect and return locking projection 96 into the aligned locking recess 60*a*, 60*b***.

Figure 11:
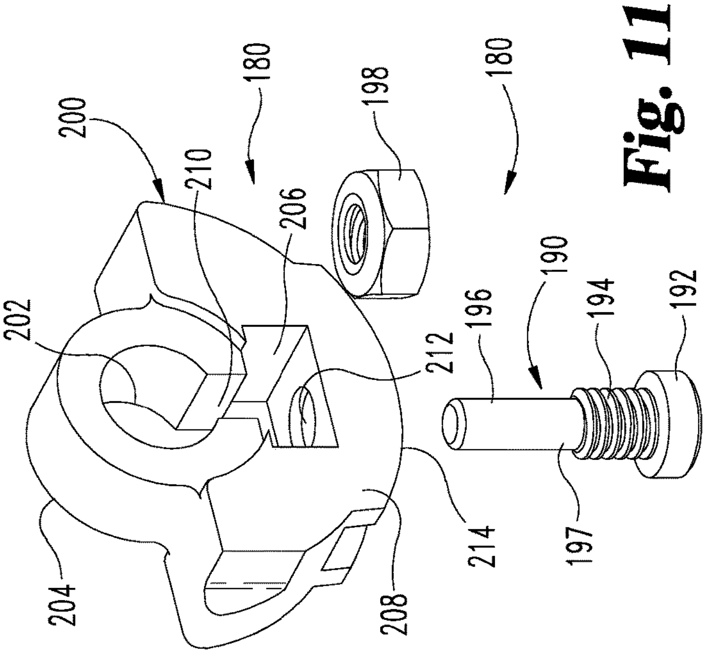
FIG. 11 is an exploded perspective view of another embodiment input cam assembly configured to permit reversal of the handing of the lever handle.
Figure 12:
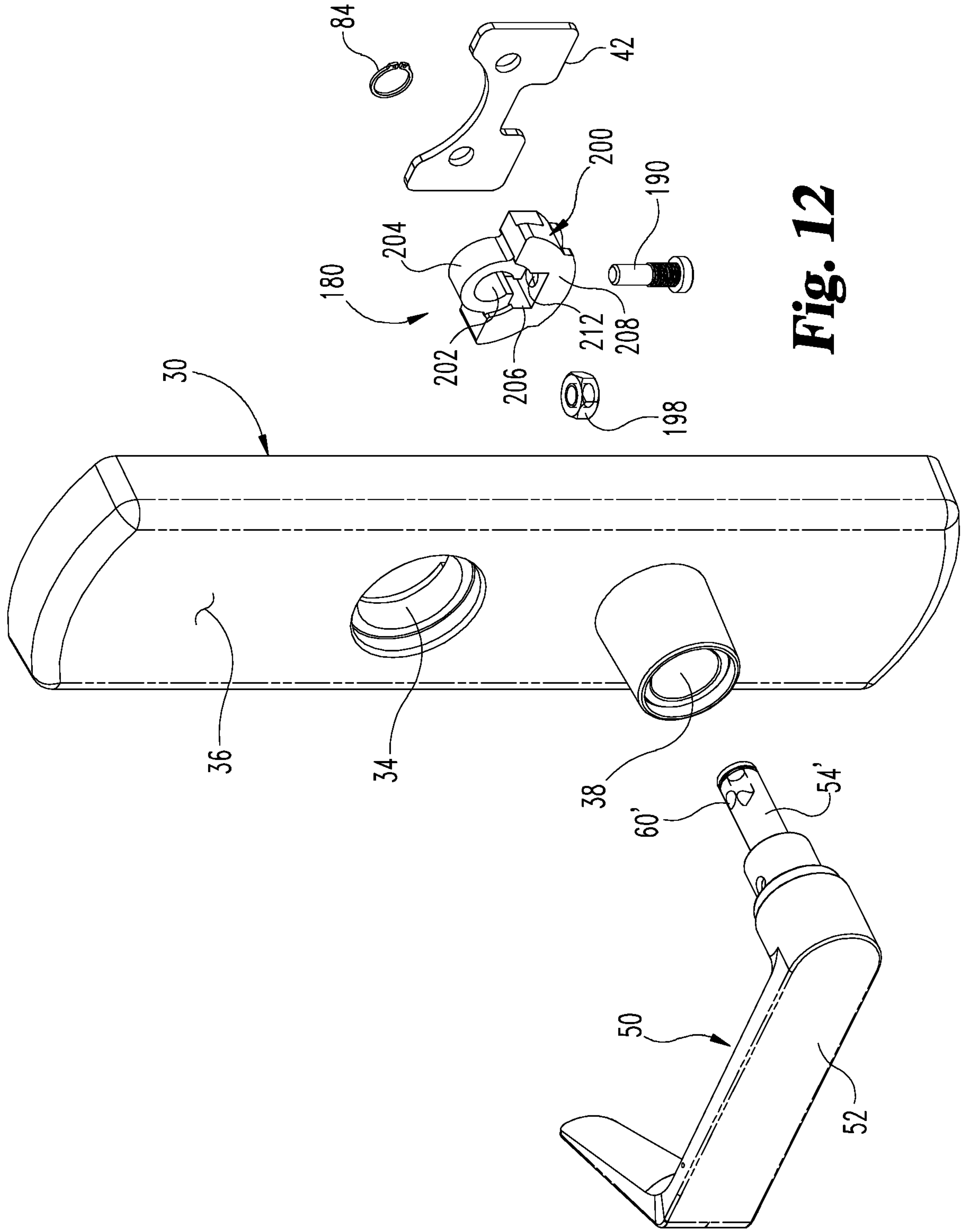
FIG. 12 is an exploded perspective view of the exit trim assembly with the input cam assembly of FIG. 11 looking toward an exterior of the escutcheon housing.
Figure 13:
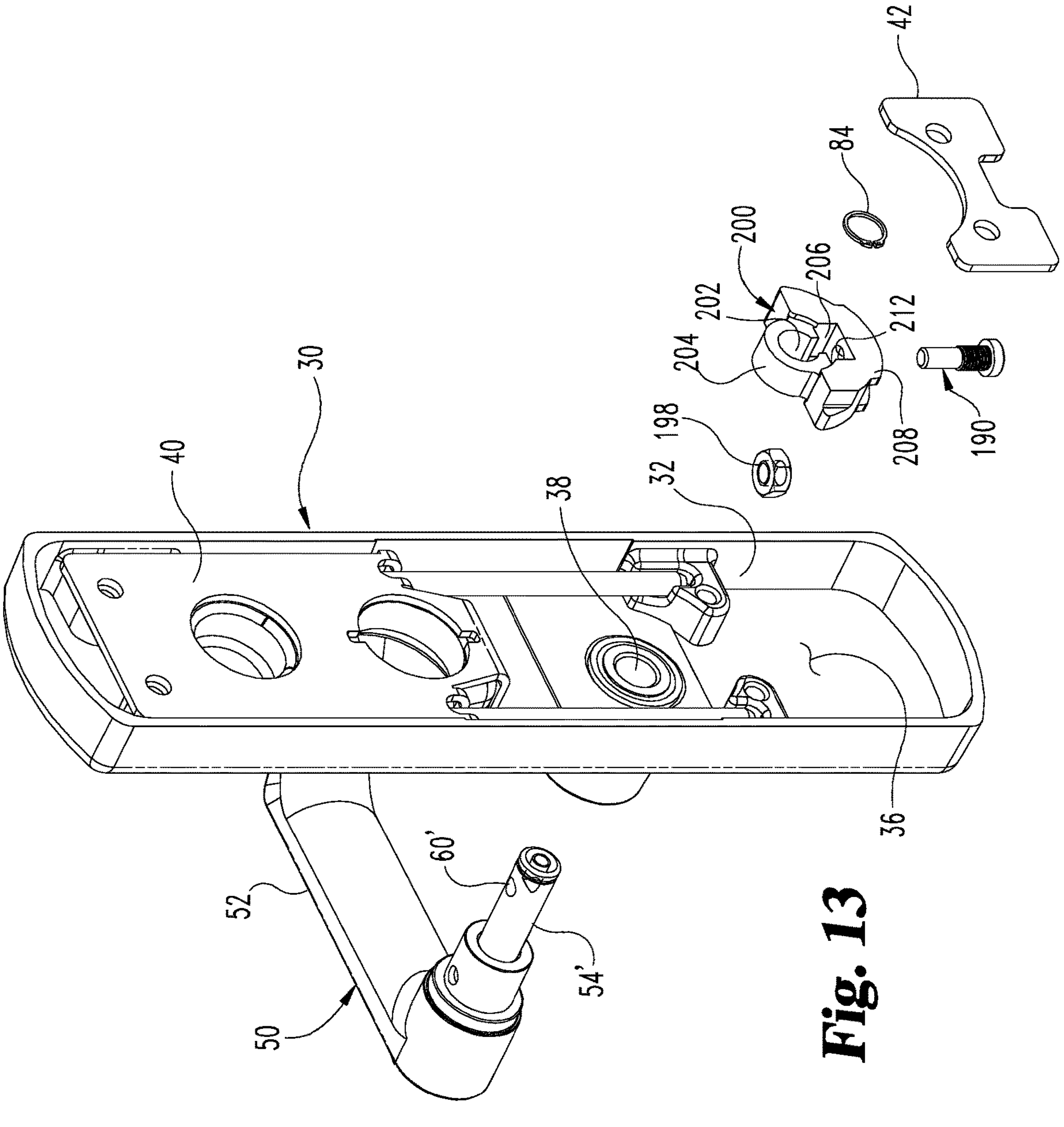
FIG. 13 is another exploded perspective view of the exit trim assembly with the input cam assembly of FIG. 11 looking toward an interior of the escutcheon housing.

Referring now to FIGS. 11-13, another embodiment input cam assembly 180 is shown. Input cam assembly 180 lacks a biasing member, but includes another embodiment locking member 190 that is configured to secure lever handle 50 in a desired one of the left hand and right hand orientations to input cam assembly 180. Input cam assembly 180 includes an input cam 200 that defines a first aperture 202 in a first body portion 204 to receive spindle portion 54, and a compartment 206 in a second body portion 208. Compartment 206 is in communication with first aperture 202 through a slot 210. In addition, second body portion 208 defines a bore 212 extending through second body portion 208 that opens at a bottom side 214 of second body portion 208 and at compartment 204.

Locking member 190 includes a head 192, a threaded shaft portion 194 extending from head 192, and a non-threaded shaft portion 196 extending from threaded shaft portion 194. Bore 212 receives threaded shaft portion 194 of locking member 190. Locking member 190 further incudes a lock nut 198 that is non-rotatably captured in compartment 206 of input cam 200, and which is threadingly engaged by threaded shaft portion 194 extending from bore 212. Non-threaded shaft portion 196 projects from locking member 190 into a receiving bore 60' of a spindle portion 54' to couple spindle portion 54' to input cam 200. Spindle portion 54' is similar to spindle portion 54 but includes receiving bore 60' rather than longitudinal locking recesses **60*a*, 60*b***.

Since receiving bore 60' extends through and opens at diametrically opposite sides of spindle portion 54', lever handle 50 is engageable in either the left or right hand orientations at a perpendicular orientation to the adjacent edge 22 of door 20. In order to reverse the handing of lever handle 50, head 192 can be accessed by a driving tool or key through gap 72 to unthread locking member 190 through lock nut 198 until non-threaded shaft portion 196 is withdrawn from receiving bore 160, allowing spindle portion 54' to rotate relative to input cam 200 so the handing of handle portion 52 can be reversed. Locking member 190 can then be threaded into lock nut 198 to re-position non-threaded shaft portion in receiving bore 60' through the opposite side opening of receiving bore 60'.

An additional feature of locking member 190 is that it can be configured to provide protections against an over-turn force that is applied to handle portion 52. An over-turn force, as used herein, is a turning force applied to handle portion 53 that is over a threshold turning force. For example, a shear feature 197, such as a reduced cross-sectional area, can be provided between threaded shaft portion 194 and non-threaded shaft portion 196. If a force in excess of the threshold turning force (over-turn force) is applied to handle portion 52, locking member 190 severs at shear feature 197, preventing the over-turn force from being transmitted to input cam 200 and transmitted to other internal components connected with input cam assembly 180.

Figure 14:
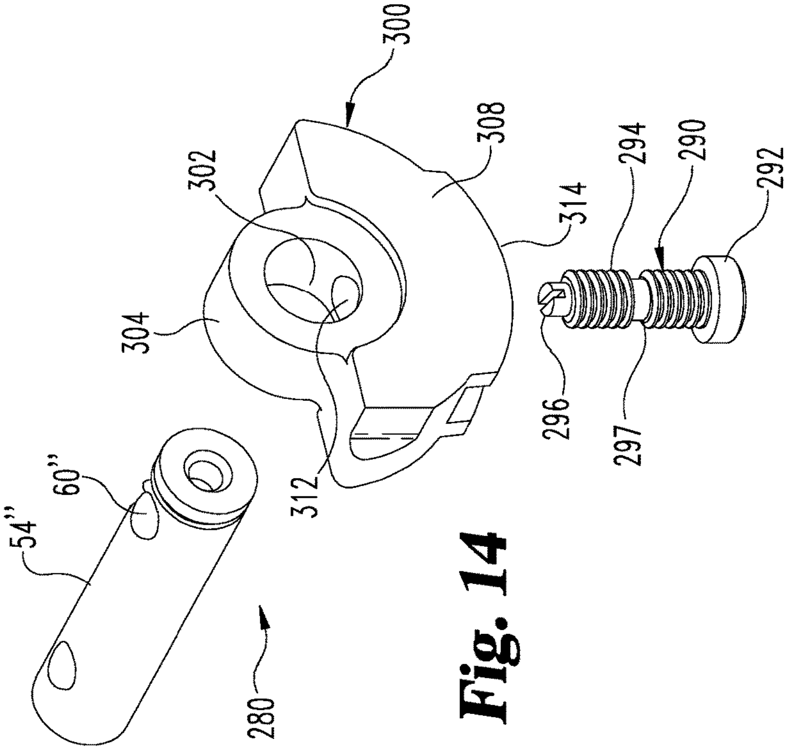
FIG. 14 is an exploded perspective view of another embodiment input cam assembly configured to permit reversal of the handing of the lever handle.
Figure 15:
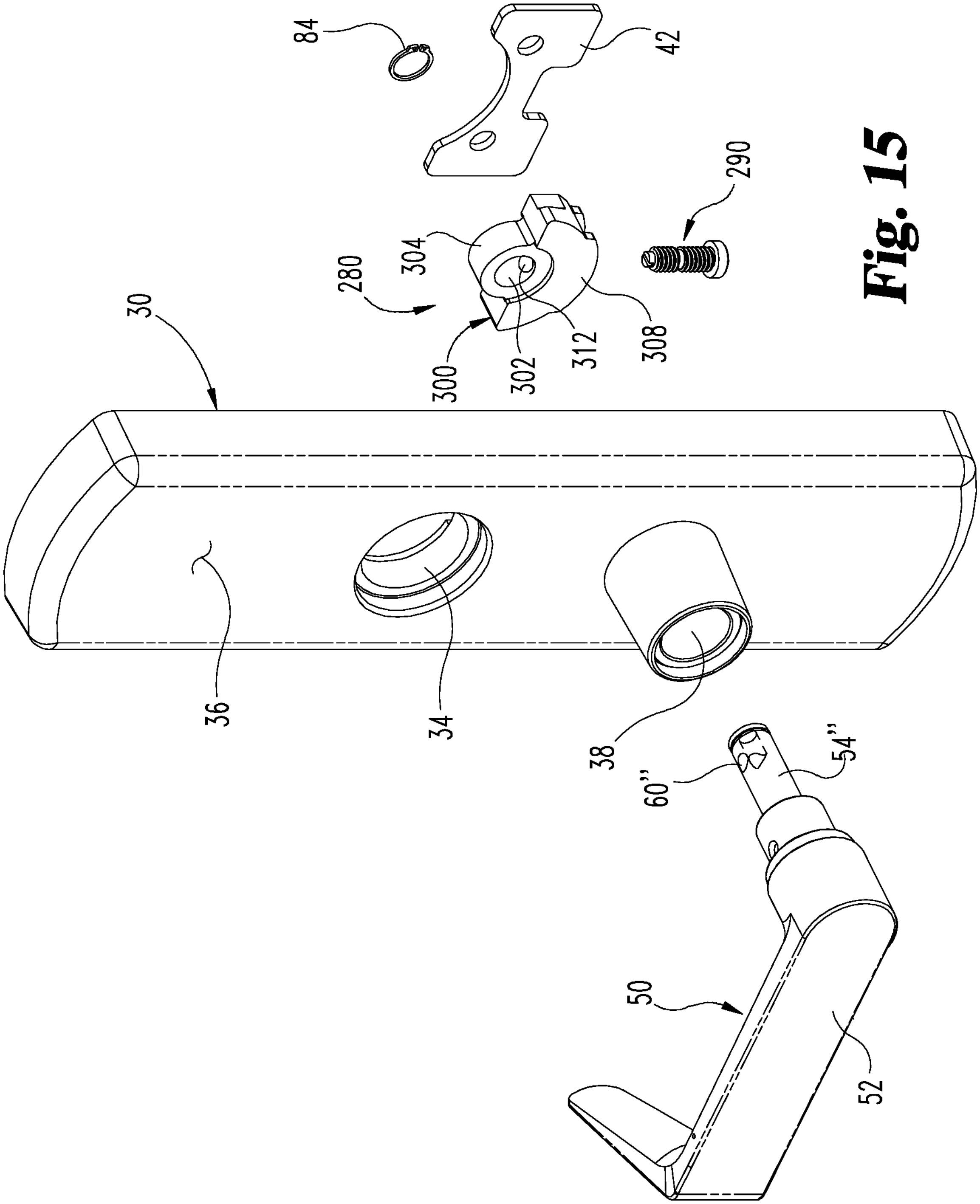
FIG. 15 is an exploded perspective view of the exit trim assembly with the input cam assembly of FIG. 14 looking toward an exterior of the escutcheon housing.
Figure 16:
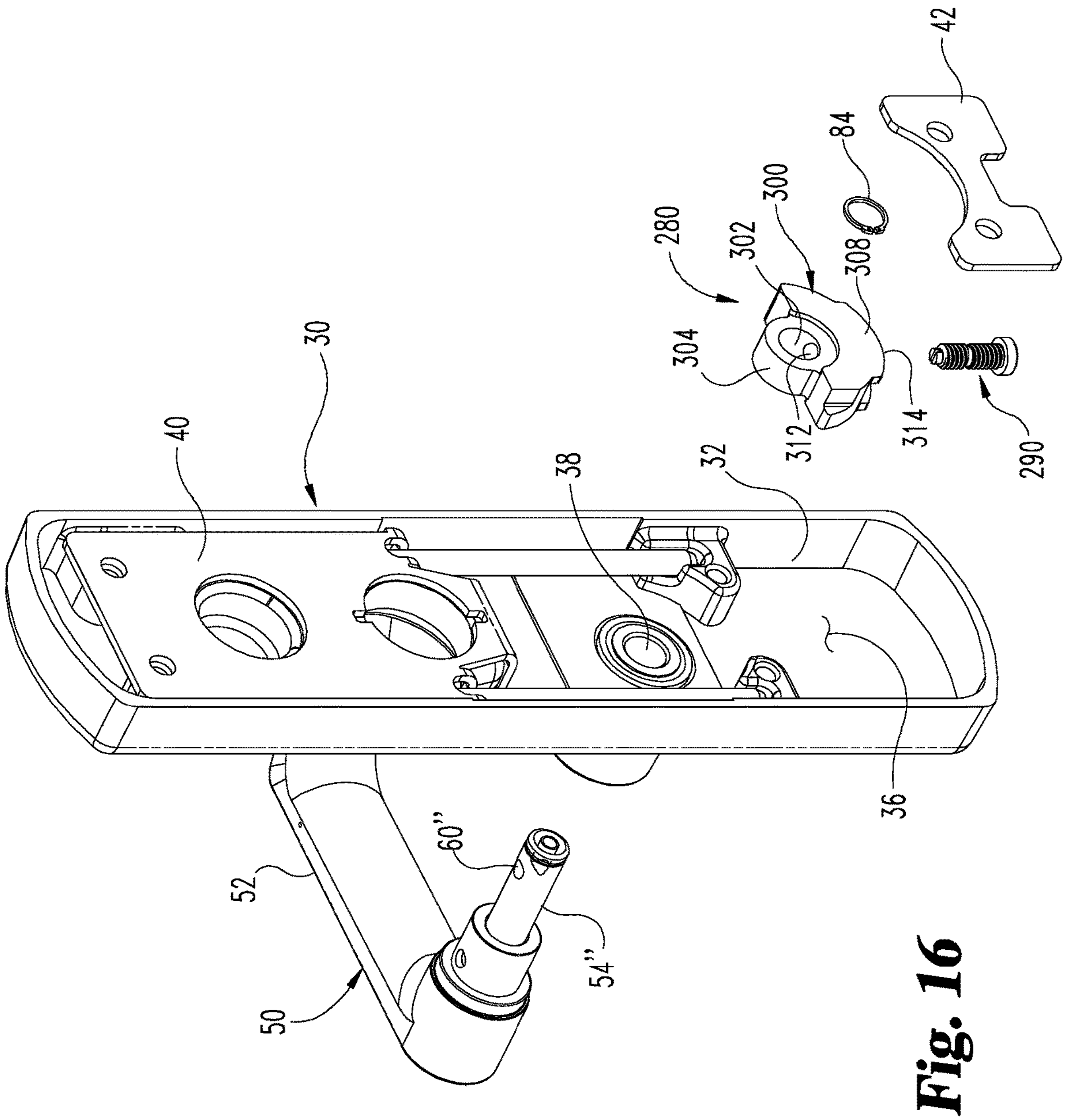
FIG. 16 is another exploded perspective view of the exit trim assembly with the input cam assembly of FIG. 14 looking toward an interior of the escutcheon housing.
Figure 17A:
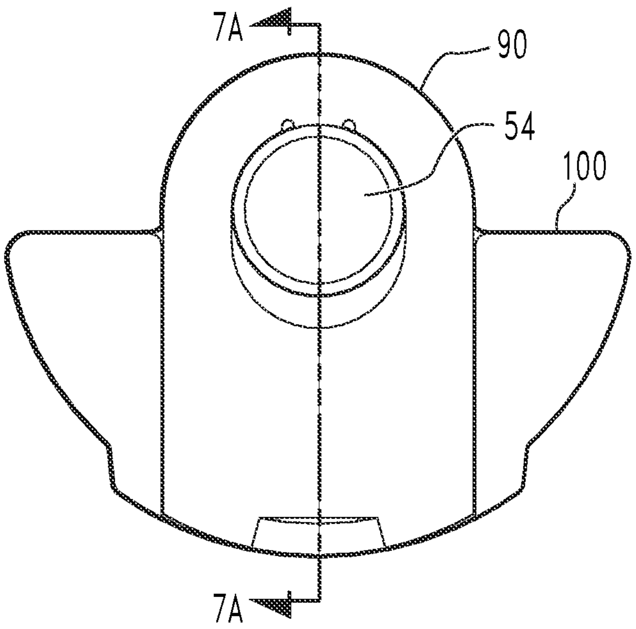
FIG. 17A is a plan view of the input cam assembly as illustrated in FIG. 7A, and includes section line 7A-7A, along which the section view of FIG. 7A is taken.
Figure 17B:
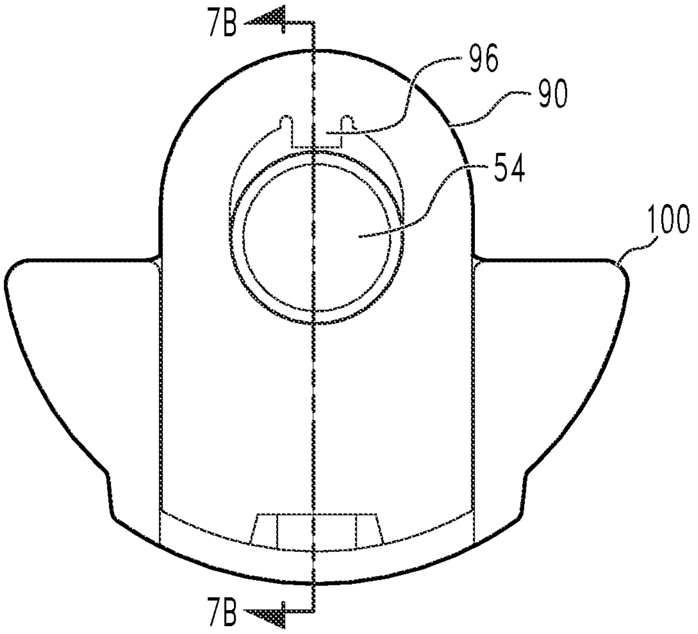
FIG. 17B is a plan view of the input cam assembly as illustrated in FIG. 7B, and includes section line 7B-7B, along which the section view of FIG. 7B is taken.

Referring now to FIGS. 14-16, another embodiment input cam assembly 280 is shown. Input assembly 280 is similar to input cam assembly 180, but lacks a lock nut 198. Rather, input cam assembly 280 includes a locking member 290 that is configured to threadingly engage another embodiment spindle portion 54" in a threaded receiving bore 60" to secure lever handle 50 in a desired one of the left hand and right hand orientations. Input cam assembly 280 includes an input cam 300 that defines a first aperture 302 in a first body portion 304 to receive spindle portion 54", and a second body portion 308 that defines a bore 312 in communication with first aperture 302 and opening at a bottom side 314 of second body portion 308. Bore 312 can be configured to threadingly receive locking member 290.

Locking member 290 includes a head 292, a threaded shaft portion 294 extending from head 292, and a tool engagement recess 296 at an end of threaded shaft portion 294 opposite head 292. A shear feature 297 along threaded shaft portion can be located at the shear line between spindle portion 54" and input cam 300 in aperture 302 to provide a shear location that prevents transmittal of an over-turn force applied to handle portion 52 to input cam assembly 180. Threaded shaft portion 294 projects into a receiving bore 60" of a spindle 54". Spindle 54" is similar to spindle 54' but includes a threaded receiving bore 60". In the event locking member 290 is severed at shear feature 297, the severed part of threaded shaft portion 294 lodged in receiving bore 60" can be removed by a driving tool rotating the severed part via tool engagement recess 296 to unthreaded the severed part from receiving bore 60".

Since receiving bore 60" extends through and opens at diametrically opposite sides of spindle portion 54", lever handle 50 is engageable in either the left or right hand orientations at a perpendicular orientation to the adjacent edge 22 of door 20. In order to change the handing of lever handle 50, head 292 can be accessed by a driving tool or key through gap 72 to unthread locking member 290 until it is disengaged with spindle portion 54", allowing the spindle portion 54" to rotate relative to input cam 300 and the handing of lever handle 50 to be reversed. Locking member 290 can then be re-threaded into receiving bore 60" to re-position threaded shaft portion 294 into receiving bore 60" and rotatably couple the lever handle 50 to input cam assembly 280.

Various aspects of the present disclosure are contemplated. For example, one aspect includes an exit trim assembly for a door. The exit trim assembly includes an escutcheon housing defining an interior and at least one opening through the housing, and a lever handle extending from the housing in a first orientation. The lever handle includes a spindle portion and a handle portion extending from the spindle portion. The spindle portion extends through the at least one opening into the interior of the escutcheon housing. The spindle portion includes a first locking recess in an outer surface of the spindle portion and a second locking recess in the outer surface generally opposite the first locking recess. The exit trim assembly also includes an input cam positioned around the spindle portion in the interior of the escutcheon housing and a locking member positioned around the spindle portion in engagement with the input cam. The locking member includes a locking projection that is received in the first locking recess to couple the lever handle with the input cam so that rotation of the lever handle pivots the input cam. The exit trim assembly also includes a biasing member engaged to the input cam and the locking member to bias the locking projection into the first locking recess. The locking member is moveable against the bias to remove the locking projection from the first locking recess so that the lever handle is rotatable relative to the input cam and the locking member to position the handle portion in a second orientation substantially opposite the first orientation. The biasing member biases the locking projection into the second locking recess of the spindle portion when the locking member is released to re-engage the lever handle with the input cam in the second orientation.

In one embodiment, the locking member defines a first aperture for receiving the spindle portion of the lever handle and the locking projection extends into the first aperture. In a refinement of this embodiment, the input cam includes a first body portion defining a second aperture therethrough for receiving the spindle portion of the lever handle and the input cam further includes a second body portion defining a compartment. The locking member includes a support flange that extends into the compartment, and the biasing member extends between the input cam and the support flange in the compartment to bias the locking projection of the locking member into an aligned one of the first and second locking recesses. In a further refinement, the locking member extends between a first end and an opposite second end, and the locking projection is located adjacent the first end. The second end defines a notch for receiving an engagement tool to displace the locking member against the biasing member to remove the locking projection from an engaged one of the first and second locking recesses of the spindle portion.

In another embodiment, the input cam includes a recessed surface facing the handle portion of the lever handle and the locking member is positioned in the recessed surface. In refinement of this embodiment, the input cam includes a first body portion defining a first aperture for receiving the spindle portion and a second body portion defining the compartment. The first body portion is cylindrical and the second body portion is semi-cylindrical and projects outwardly from the first body portion. The recessed surface is defined along the second body portion.

In yet another embodiment, the biasing member is a coil spring. In another embodiment, the first locking recess and the second locking recess are each offset from respective adjacent locations on the spindle portion that define perpendicular orientations of the handle portion with an adjacent edge of the door. In a refinement of this embodiment, the first and second locking recesses extend longitudinally along the spindle portion through an inner end of the spindle portion.

In another embodiment, the handle portion is non-perpendicular to an adjacent edge of the door when the handle portion is in either of the first orientation and the second hand orientation. In yet another embodiment, the biasing member is positioned around the spindle portion, and the biasing member includes a spring tab extending through the locking member and into the compartment of the input cam. In a refinement of this embodiment, the locking member includes a passage and the spring tab extends through the passage, and the locking member is mounted to the spindle portion between the biasing member and the input cam.

In another aspect, an exit trim assembly for a door includes an escutcheon housing defining an interior and at least one opening through the escutcheon housing, and a lever handle extends from the escutcheon housing. The lever handle includes a spindle portion and a handle portion extending from the spindle portion in a first orientation, the spindle portion extending through the at least one opening into the interior of the escutcheon housing. The spindle portion includes a receiving bore opening on opposite first and second sides of the spindle portion and an input cam positioned around the spindle portion in the interior of the escutcheon housing. The input cam defines an aperture for receiving the spindle portion and a bore extends through the input cam in intersecting relation with the aperture. The exit trim assembly further includes a locking member positioned in the bore of the input cam and into the receiving bore of the spindle portion to couple the spindle portion with the input cam in the first orientation. The locking member is movable relative to the input cam to withdraw the locking member from the receiving bore at a first side of the spindle portion to de-couple the spindle portion from the input cam and allow rotation of the lever handle relative to the input cam to reverse a handing of the handle portion from the first orientation to a second orientation that is opposite the first orientation. The locking member is re-positionable into the receiving bore from the second side of the spindle portion to couple the lever handle with the input cam with the handle portion in the second orientation.

In one embodiment, the locking member includes a head and a threaded shaft portion extending from the head that is positioned in the bore of the input cam. In a refinement of this embodiment, the threaded shaft portion is threadingly engaged to the spindle portion in the receiving bore. In a further refinement, the locking member includes a shear feature along the threaded shaft portion that defines a shear location between the spindle portion and the input cam where the threaded shaft portion severs in response to an over-turn force applied to the handle portion. In still a further refinement, the threaded shaft portion includes a tool engagement recess opposite the head. The tool engagement recess is accessible through the receiving bore to remove a severed part of the threaded shaft portion from the receiving bore of the spindle portion.

In another refinement of this embodiment of the locking member, the locking member includes a non-threaded shaft portion extending from the threaded shaft portion that is received within the receiving bore of the spindle portion. In a further refinement, the input cam includes a compartment between the aperture of the input cam and the bore of the input cam, and a lock nut is positioned in the compartment in threaded engagement with the threaded shaft portion of the locking member. In yet a further refinement, the lock nut is non-rotatably captured in the compartment. In another refinement, the input cam includes a slot between the aperture and the compartment.

In another embodiment, the handle portion is perpendicular to an adjacent edge of the door when the handle portion is in either of the first orientation and the second orientation.

It should be understood that the component and assembly configurations of the present disclosure can be varied according to specific design requirements and need not conform to the general shape, size, connecting means or general configuration shown in the illustrative drawings to fall within the scope and teachings of this patent application.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law.

Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method for handing an exit trim assembly for a door, the method comprising:
- positioning a lever handle through an input cam located within an escutcheon;
- coupling the lever handle to the input cam in a first orientation relative to the door with a locking member that is movably positioned in a recessed surface of the input cam or movably positioned in a bore of the input cam and engaged to the lever handle;
- displacing the locking member in the recessed surface or in the bore relative to the input cam in order to disengage the locking member from the lever handle and decouple the lever handle from the input cam;
- rotating the de-coupled lever handle from the first orientation to a second orientation that is substantially opposite the first orientation; and
- coupling the lever handle in the second orientation to the input cam with the locking member re-engaged to the lever handle and movably positioned in the recessed surface of the input cam or movably positioned in the bore of the input cam.

2. The method of claim 1, wherein positioning the lever handle including positioning the lever handle through both the locking member and the input cam.

3. The method of claim 1, further comprising positioning a locking projection in a recess in order to couple the lever handle with the input cam in each of the first orientation and the second orientation.

4. The method of claim 3, wherein a biasing member biases the locking projection into the recess.

5. The method of claim 1, wherein the locking member is positioned in the recessed surface of the input cam and the locking member is movable along the recessed surface between outwardly projecting portions of the input cam on opposite sides of the recess surface to couple and de-couple the lever handle from the input cam.

6. The method of claim 1, wherein the lever handle is rotatable about a rotation axis between the first orientation and the second orientation, and the locking member is displaced perpendicularly to the rotation axis to decouple the input cam from the lever handle.

7. The method of claim 1, wherein the first orientation and the second orientation of the lever handle are each non-perpendicular to an adjacent edge of the door.

8. The method of claim 1, wherein displacing the locking member includes unthreading the locking member in the bore of the input cam away from the lever handle in order to decouple the lever handle from the input cam.

9. The method of claim 1, wherein displacing the locking member includes inserting an engagement tool in a notch of the locking member and manipulating the locking member with the engagement tool in order to de-couple the lever handle from locking member.

10. The method of claim 9, wherein the engagement tool is inserted through a gap between a wall of the escutcheon and an end plate mounted to the lever handle adjacent to the input cam in order to be inserted in the notch.

11. A method for handing an exit trim assembly for a door, the method comprising:
- positioning a lever handle through an input cam assembly located within an escutcheon, the input cam assembly including a first portion configured to operate a latch mechanism to open and close the door, the input cam assembly including a second portion movable in a recessed surface or a bore of the first portion to releasably lock the lever handle to the first portion;
- rotating the lever handle to one of a first orientation and a second orientation relative to the door, wherein the second orientation is substantially opposite the first orientation;
- locking the lever handle in the one of the first orientation and the second orientation by movably positioning the second portion of the input cam assembly in the recessed surface or the bore of the first portion;
- unlocking the lever handle by displacing the second portion of the input cam assembly in the recessed surface or the bore of the first portion to disengage the second portion from the lever handle;
- re-orienting the lever handle to the other of the first orientation and the second orientation; and
- locking the re-oriented lever handle in the other of the first orientation and the second orientation by movably positioning the second portion of the input cam assembly in the recessed surface or the bore of the first portion.

12. The method of claim 11, wherein locking the lever handle includes locking the input cam assembly onto an elongated spindle of the lever handle in the first orientation and in the second orientation.

13. The method of claim 12, wherein an outer surface of the spindle includes locking recesses along opposite sides of the spindle, and the input cam assembly is locked into one of the locking recesses in the first orientation and in the second orientation.

14. The method of claim 12, wherein the spindle includes at least one locking bore extending into the spindle, and the input cam assembly is locked into the at least one locking bore in the first orientation and in the second orientation.

15. The method of claim 11, wherein the first portion of the input cam assembly includes a receiving aperture through which the lever handle is positioned.

16. The method of claim 11, wherein the second portion of the input cam assembly is biased into engagement with lever handle in the first orientation and in the second orientation.

17. A method for handing an exit trim assembly for a door, the method comprising:

positioning a lever handle through an input cam assembly located within an escutcheon, the input cam assembly including a first portion configured to operate a latch mechanism to open and close the door and a second portion movable in the first portion that is configured to releasably lock the lever handle to the first portion;

rotating the lever handle to one of a first orientation and a second orientation relative to the door, wherein the second orientation is substantially opposite the first orientation;

locking the lever handle in the one of the first orientation and the second orientation with the second portion of the input cam assembly;

unlocking the second portion of the input cam assembly from the lever handle;

re-orienting the lever handle to the other of the first orientation and the second orientation; and locking the re-oriented lever handle with the second portion of the input cam assembly in the other of the first orientation and the second orientation;

wherein the input cam assembly includes a locking member and an input cam, the input cam including a receiving aperture through which the lever handle is positioned with the locking member coupling the lever handle to the input cam in the first orientation and in the second orientation; and wherein the locking member is threadingly engaged in a threaded bore of the input cam that opens into the receiving aperture, and wherein the locking member extends into a receiving bore in the lever handle in the first orientation and in the second orientation.

18. The method of claim 17, wherein the locking member is threadingly engaged to the lever handle in the first orientation and in the second orientation.

19. A method for handing an exit trim assembly for a door, the method comprising:

inserting an engagement tool into engagement with a locking member located within an escutcheon while the locking member is engaged to a lever handle;

manipulating the engagement tool to displace the locking member in a recessed surface of an input cam or in a bore of the input cam in order to de-couple the lever handle from the input cam and disengage the locking member from the lever handle, wherein the input cam is configured to operate a latch mechanism of the door;

rotating the de-coupled lever handle from a first orientation relative to the door to a second orientation relative to the door that is substantially opposite the first orientation; and coupling the lever handle in the second orientation to the input cam with the locking member re-engaged to the lever handle and movably received in the recessed surface of the input cam or movably received in the bore of the input cam.

20. The method of claim 19, wherein manipulating the engagement tool displaces the locking member transversely to a spindle of the lever handle to disengage the locking member from the spindle.

* * * * *